(12) United States Patent
Harvey

(10) Patent No.: US 7,504,142 B2
(45) Date of Patent: *Mar. 17, 2009

(54) PACKAGING LAMINATES AND ARTICLES MADE THEREFROM

(75) Inventor: Christopher John Harvey, Appleton, WI (US)

(73) Assignee: Curwood, Inc., Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/895,605

(22) Filed: Aug. 24, 2007

(65) Prior Publication Data

US 2008/0050545 A1 Feb. 28, 2008

Related U.S. Application Data

(63) Continuation-in-part of application No. 11/087,037, filed on Mar. 22, 2005, now Pat. No. 7,279,206.

(51) Int. Cl.
*B29D 22/00* (2006.01)

(52) U.S. Cl. ............... 428/35.4; 428/213; 428/347; 428/349; 428/355 R; 428/515; 428/516; 428/520

(58) Field of Classification Search .......... 428/213, 428/35.4, 347, 349, 355 R, 515, 516, 520
See application file for complete search history.

(56) References Cited

U.S. PATENT DOCUMENTS 4,178,401 A 12/1979 Weinberg et al.
7,279,206 B2 * 10/2007 Schell et al. ............... 428/35.4

* cited by examiner

*Primary Examiner*—Leszek Kiliman
(74) *Attorney, Agent, or Firm*—Tom J. Hall

(57) ABSTRACT

Film laminates for packaging applications having at least two polymer layers which are formed together as a coextruded blown film such that the first polymer layer is a surface layer relative to the film and comprises a heat-sealable material having a melt index of at least 20 g/10 min. The present invention further provides food packages formed from these film laminates.

40 Claims, 5 Drawing Sheets

PACKAGING LAMINATES AND ARTICLES MADE THEREFROM

RELATED APPLICATIONS

This application is a continuation-in-part of U.S. patent application Ser. No. 11/087,037, filed Mar. 22, 2005, which is incorporated herein by reference in its entirety.

FIELD OF THE INVENTION

The present invention generally relates to thermoplastic film laminates for food packaging applications, and particularly, to blown coextruded packaging film laminates comprising at least a first and second polymer layer. The present invention also relates to packages formed from these film laminates.

BACKGROUND OF THE INVENTION

Packaging film laminates for food packaging applications, particularly for, high speed packaging applications, such as, for example, vertical form-fill-seal (VFFS) and/or horizontal form-fill-seal (HFFS) processes, are well known to those skilled in the art. Many of known film laminates for these applications have a generalized structure of A/B/C/B/D where A is an external heat-seal layer, B is an internal layer of nylon, C is an internal core layer of ethylene/vinyl alcohol copolymer, and D is an external abuse layer. For example, U.S. Pat. No. 4,909,726 to Bekele discloses a hot blown coextruded film for packaging meat which includes a core layer containing ethylene/vinyl alcohol copolymer surrounded by two adjacent layers comprising nylon. Suitable materials for use in the heat-seal layer include resins having a fractional melt index (less than 1.0 g/10 min) which are selected from the group consisting of ethylene alpha-olefin copolymers, low density polyethylenes, and ethylene ester copolymers. U.S. Pat. No. 6,562,476 to Shepard et al. describe coextruded blown film laminates for packaging food products, such as meat and cheese. Shepard et al. teach of films which include two internal layers of amorphous nylon having nylon nucleating agents, a core layer of ethylene/vinyl alcohol copolymer, and a sealant layer comprising a material selected from the group consisting of linear polyethylenes, ethylene alpha-olefin copolymers, ionomers, EMA, EMAA, or ethylene/vinyl acetate. Shepard et al. do not disclose the melt index of the sealable material. U.S. Pat. No. 6,682,825 to Kennedy et al. also describe film laminates for food packaging applications which include a core layer of ethylene/vinyl alcohol copolymer sandwiched between two layers of amorphous nylon. This patent teaches that the outer heat-seal layer has a thickness of about 7 to 10 percent based on the total thickness of the film. Kennedy et al. do not describe the melt index of the resins used for the heat-seal layer. U.S. Pat. No. 4,746,562 to Fant discloses film laminates particularly useful for form-fill-seal applications. Fant teaches using low density polyethylenes as suitable material for the sealant layer, but does not disclose the melt index of these resins.

It will be appreciated by those skilled in the art that film laminates having substantial amounts of high melt index material in one or more film layers, for example, a sealant layer, have inherently low melt strengths and are typically produced using a flat die process, such as, for example, cast extrusion. Those skilled in the art will also appreciate that thickness build-ups or gauge bands often form during the cast extrusion process and affect the package manufacturing process by requiring more operator intervention to the packaging equipment in order to convert these films into acceptable products. Generally, films having thickness variations will decrease production rates and increase production costs for both film and package manufacturers. It is also well known by those skilled in the art, that gauge bands may be minimized by randomizing the thickness variation during the extrusion process. One method of accomplishing randomization is by using blown film coextrusion techniques, such as, for example, single-bubble blown film coextrusion, double-bubble blown film coextrusion and the like. Applicants have discovered that films having significant amounts of high melt index material may be obtained using a blown film coextrusion process which provides packaging films having excellent sealing characteristics as required for form-fill-seal packaging applications, without sacrificing film quality and production efficacy.

SUMMARY OF THE INVENTION

It has been discovered that exceptional sealing and caulking performance may be achieved in film laminates having at least one relatively thick, external surface layer which comprises a heat-sealable material having a melt index of at least 20 g/10 min. Accordingly, the present invention provides multilayered thermoplastic film laminates which may comprise at least a first polymer layer and a second polymer layer which are formed together as a blown coextruded film. The first polymer layer may be a surface layer relative to the film laminate and may comprise a heat-sealable material having a melt index of at least 20 g/10 min as measured in accordance with ASTM D-1238 test method at 190° C./2.16 kg. One particular advantage of the laminates of the present invention is the ability of at least one external surface layer to flow relatively easily during the heat-sealing operation thereby caulking any imperfections in the seal areas that may be present. Those skilled in the art will appreciate that sealing defects may result from conventional sealing and packaging operations, e.g., the vertical form-fill-seal (VFFS) and/or horizontal form-fill-seal (HFFS) packaging processes, and the importance of minimizing or eliminating these detects in order to produce hermetically sealed packages, particularly, hermetically sealed food packages. The above described advantage of the present invention may be accomplished by using heat-sealable materials having a melt index of at least 20 g/10 min in a blown coextruded surface layer of the laminates. In one embodiment, when the heat-sealable material having a melt index of at least 20 g/10 min is present in the first polymer layer in an amount of equal to or less than 70 weight %, the thickness of the first polymer may be expressed as A, the total thickness of the film laminate may be expressed as B, and the relative values of A and B may satisfy the relationship $A/B \geq 0.3$. In another embodiment, when the heat-sealable material having a melt index of at least 20 g/10 min is present in the first polymer layer in an amount of greater than 70 weight %, the thickness of the first polymer may be expressed as A, the total thickness of the film laminate may be expressed as B, and the relative values of A and B may or may not satisfy the relationship $A/B \geq 0.3$. The present invention may further provide hermetically sealed food packages or portions thereof formed from these film laminates.

In one aspect of the present invention, the film laminates include a first polymer layer which may comprise any heat-sealable resin having a melt index of at least 20 g/10 min or any heat-sealable resin having a melt index of at least 30 g/10 min as measured in accordance with ASTM D-1238 test method at 190° C./2.16. Preferably, the first polymer layer may comprise a heat-sealable resin comprising a material selected from the group consisting of acrylate-based resin, acrylic acid-based resin, ionomer, ethylene/α-olefin copolymer (E/AO), and blends thereof. Preferably, the acrylic acid-based resin may comprise a material selected from the group consisting of ethylene/acrylic acid copolymer (E/AA), ethylene/methacrylic acid copolymer (E/MAA), and blends thereof. Preferably, the acrylate-based resin may comprise a material selected from the group consisting of methyl/methacrylate copolymer (M/MA), ethylene/vinyl acrylate copolymer (E/VA), ethylene/methacrylate copolymer (E/MA), ethylene/n-butyl acrylate copolymer (E/n-BA), and blends thereof. Preferably, the second polymer layer may comprise any polyolefin. Preferably, the film may comprise an unrestrained linear thermal shrinkage of between 0-5% at 85° C. as measured in accordance with ASTM D-2732-96 test method.

In another aspect of the present invention, the film laminates may further include a third polymer layer disposed between the first and second polymer layers such that the first, second and third polymer layers are formed together as a blown coextruded film. Preferably, the third polymer layer may comprise a polyolefin, a modified polyolefin, or an oxygen barrier material such that the film comprises an oxygen transmission rate of between 0-2.0 $cm^3/100$ $in^2$ over 24 hr at 0% RH and 23° C. as measured in accordance with ASTM D-2732-96 test method. Preferably, the third polymer layer may comprise polyethylene, modified polyethylene, or an oxygen barrier material which is selected from the group consisting of ethylene/vinyl alcohol copolymer (E/VOH), polyvinylidene chloride copolymer (PVDC), and blends thereof.

In still another aspect of the present invention, the film laminates may further include a fourth polymer layer and a fifth polymer layer such that the first, second, third, fourth, and fifth polymer layers are formed together as a blown coextruded film. The fourth polymer layer may be disposed between the first and third polymer layers, and the fifth polymer layer may be disposed between the second and third polymer layers. Preferably, both the fourth and fifth polymer layers may each comprise a nylon or nylon blend, wherein the nylon or nylon are each free of both nylon nucleating agents and amorphous nylon.

In yet another aspect of the present invention, the film laminates may further include a sixth polymer layer. Preferably, the sixth polymer layer may be a surface layer relative to the film and may be disposed adjacent to the second polymer layer. More preferably, the sixth polymer layer may comprise an oriented thermoplastic material selected from the group consisting of polyester, polyolefin, polyamide, and blends thereof.

In yet still another aspect of the present invention, the film laminates may further include a seventh polymer layer, an eighth polymer layer, and a ninth polymer layer such that the first, second, third, fourth, fifth, seventh, and eighth polymer layers are formed together as a blown coextruded film. Preferably, each of the seventh, eighth, and ninth polymer layers may comprise an adhesive (or tie layer material), wherein the seventh polymer layer may be disposed between the first and fourth polymer layers, the eighth polymer layer may be disposed between the second and fifth polymer layers, and the ninth polymer layer may be disposed between the second and sixth polymer layers. Preferably, the sixth polymer layer may be a surface layer relative to the film and may be disposed adjacent to the ninth polymer layer. Preferably, the sixth polymer layer may comprise an oriented thermoplastic material selected from the group consisting of polyester, polyolefin, polyamide, and blends thereof.

DETAILED DESCRIPTION OF THE INVENTION

Figure 1:
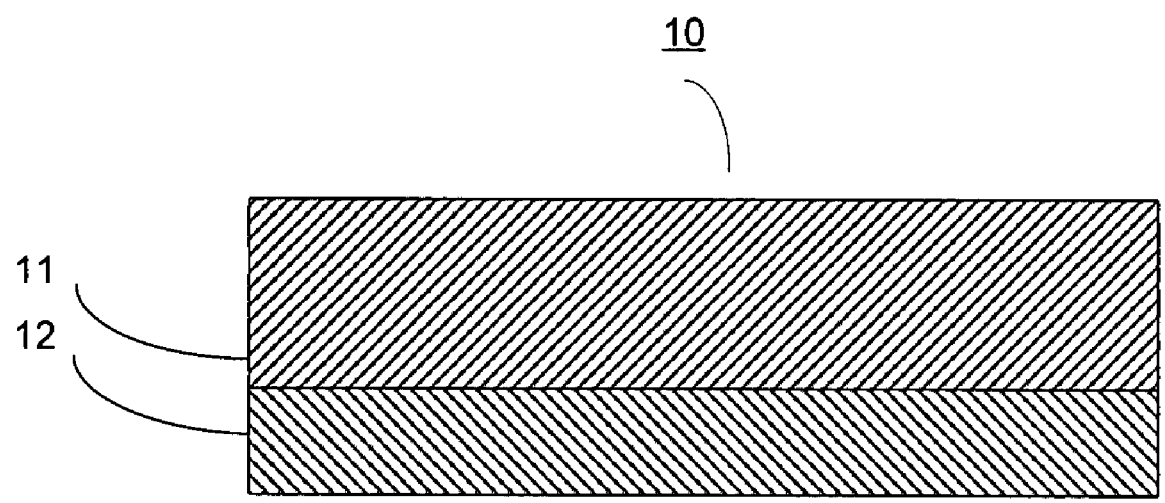
FIG. 1 is a partially schematic, cross-sectional view of one embodiment of a film laminate according to the present invention formed from at least a first polymer layer and second polymer layer.

As used herein, the term "multilayer" refers to a plurality of layers in a single film or substrate structure generally in the form of a sheet or web which can be made from a polymer material or a non-polymer material bonded together by any conventional means known in the art, i.e., coextrusion, extrusion coating, lamination, vacuum vapor deposition coating, solvent coating, emulsion coating, or suspension coating or combination of one or more thereof.

As used herein, the term "laminate" and the phrase "film laminate", when used as a noun, refer to the resulting product made by bonding together two or more substrates, layers or other materials. "Laminate" when used as a verb, means to affix or adhere (by means of, for example, coextrusion, adhesive bonding, pressure and heat bonding, corona lamination, and the like) two or more polymer layers so as to form a multilayer structure.

As used herein, the phrase "thermoplastic" refers to a polymer or polymer mixture that softens when exposed to heat and returns to its original condition when cooled to room temperature. In general, thermoplastic materials include, but are not limited too, synthetic polymers such as polyamides, polyolefins, polyalkyl acrylates, polyesters, ethylene/vinyl alcohol copolymers, and the like. Thermoplastic materials may also include any synthetic polymer that is cross-linked by either radiation or chemical reaction during a manufacturing process operation.

As used herein, the term "polymer" refers to the product of a polymerization reaction, and is inclusive of homopolymers, copolymers, terpolymers, etc. In general, the layers of a film or film substrate can consist essentially of a single polymer, or can have still additional polymers together therewith, i.e., blended therewith.

As used herein, the term "copolymer" refers to polymers formed by the polymerization of reaction of at least two different monomers. For example, the term "copolymer" includes the co-polymerization reaction product of ethylene and an α-olefin, such as 1-hexene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer", refers to a copolymer in which either a monomer may co-polymerize in a higher weight or molar percent than the other monomer or monomers. However, the first listed monomer preferably polymerizes in a higher weight percent than the second listed monomer.

As used herein, terminology employing a "/" with respect to the chemical identity of a copolymer (e.g., polyvinylidene chloride/methyl acrylate copolymer), identifies the comonomers which are co-polymerized to produce the copolymer.

As used herein, the term "coextruded" refers to the process of extruding two or more polymeric materials through a single die with two or more orifices arranged so that the extrudates merge and weld together into a laminar structure before chilling and solidifying. The film substrates of the present invention may be generally prepared from dry resins which are melted in an extruder and passed trough a die to form the primary film material, most commonly in a tube form. In the coextruded films of the present invention, all layers were simultaneously coextruded, cooled via water, chilled metal roll, or air quenching, and then reheated for biaxial orientation. Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

As used herein, the term "oriented" refers to a thermoplastic web which forms a film structure in which the web has been elongated in either one direction ("uniaxial") or two directions ("biaxial") at elevated temperatures followed by being "set" in the elongated configuration by cooling the material while substantially retaining the elongated dimensions. This combination of elongation at elevated temperatures followed by cooling causes an alignment of the polymer chains to a more parallel configuration, thereby improving the mechanical properties of the polymer web. Upon subsequently heating of certain unrestrained, unannealed, oriented sheet of polymer to its orientation temperature, heat shrinkage may be produced. Following orientation, the oriented polymer web is preferably cooled and then heated to an elevated temperature, most preferably to an elevated temperature which is above the glass transition temperature and below the crystalline melting point of the polymer. This reheating step, which may be referred to as annealing or heat setting, is performed in order to provide a polymer web of uniform flat width. In accordance with the present invention, uniaxial- or biaxial-oriented polymer webs may be used to form substrate layers.

As used herein, the term "polyolefin" refers to homopolymers, copolymers, including, e.g., bipolymers, terpolymers, etc., having a methylene linkage between monomer units which may be formed by any method known to those skilled in the art. Examples of polyolefins include polyethylene (PE), low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/α-olefin which are copolymers of ethylene with one or more α-olefins (alpha-olefins) such as butene-1, hexene-1, octene-1, or the like as a comonomer, and the like.

As used herein, the phrase "ethylene/α-olefin" (E/AO) refers to a modified or unmodified copolymer produced by the co-polymerization of ethylene and any one or more α-olefin. The α-olefin in the present invention may have between 3-20 pendant carbon atoms. The co-polymerization of ethylene and an α-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al., both of which are hereby incorporated, by reference thereto, in their entireties. Heterogeneous catalyzed copolymers of ethylene and an α-olefin may include linear low-density polyethylene, very low-density polyethylene and ultra low-density polyethylene. These copolymers of this type are available from, for example, The Dow Chemical Company, of Midland, Mich., U.S.A. and sold under the trademark DOWLEX™ resins. Additionally, the co-polymerization of ethylene and an α-olefin may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798 to Canich, the teachings of which are incorporated herein by reference. Homogeneous catalyzed ethylene/α-olefin copolymers (E/AO) may include modified or unmodified ethylene/α-olefin copolymers having a long-chain branched (8-20 pendant carbons atoms) α-olefin comonomer available from The Dow Chemical Company, known as AFFINITY™ and ATTANE™ resins, TAFMER™ linear copolymers obtainable from the Mitsui Petrochemical Corporation of Tokyo, Japan, and modified or unmodified ethylene/α-olefin copolymers having a short-chain branched (3-6 pendant carbons atoms) α-olefin comonomer known as EXACT™ resins obtainable from ExxonMobil Chemical Company of Houston, Tex., U.S.A.

As used herein, the term "ionomer" refers to metal-salt, e.g., sodium or zinc, neutralized ethylene acrylic or methacrylic acid copolymers. Commercially available ionomers are sold under the trademark SURLYN® from E.I. de Pont de Nemours and Company, Wilmington, Del., U.S.A.

As used herein, the term "modified" refers to a chemical derivative, e.g., one having any form of anhydride functionality, such as anhydride of maleic acid, crotonic acid, citraconic acid, itaconic acid, fumaric acid, etc., whether grafted onto a polymer, co-polymerized with a polymer, or blended with one or more polymers, and is also inclusive of derivatives of such functionalities, such as acids, esters, and metal salts derived therefrom.

As used herein, the term "polyester" refers to homopolymers or copolymers having an ester linkage between monomer units which may be formed, for example, by condensation polymerization reactions between a dicarboxylic acid and a glycol. The ester monomer unit can be represented by the general formula: [RCO$_2$R'] where R and R'=alkyl group. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. An example of a preferred polyester is polyethylene terephthalate copolymer and, more preferably, biaxial-oriented polyethylene terephthalate copolymer.

As used herein, the phrase "acrylic acid-based resin" refers to homopolymers and copolymers having an acrylic acid and/or a methacrylic acid linkage between monomer unit. These monomer units have the general formula: $[H_2C\text{—}C](R)(CO_2H)$ where R=H, alkyl group. Acrylic acid-based resins may be formed by any method known to those skilled in the art and may include polymerization of acrylic acid, or methacrylic acid in the presence of light, heat, or catalysts such as benzoyl peroxides, or by the esters of these acids, followed by saponification. Examples of acrylic acid-based resins include, but are not limited to, ethylene/acrylic acid copolymer (E/AA), ethylene/methacrylic acid copolymer (E/MAA), and blends thereof.

As used herein, the phrase "acrylate-based resin" refers to homopolymers and copolymers having an ester of acrylic acid linkage between the monomer unit. The acrylic acid monomer unit can be represented by the general formula: $[H_2C\text{—}C](R)(CO_2R')$ where R=H, alkyl group and R'=same or different alkyl group as R. Acrylate-based resins may be formed by any method known to those skilled in the art, such as, for example, polymerization of the acrylate monomer, which may include monomers units more commonly referred to as "acetate" and "vinyl acetate" monomers, by the same methods as those described for acrylic acid-based resins. Examples of acrylate-based resin include, but are not limited to, methyl/methacrylate copolymer (M/MA), ethylene/vinyl acrylate copolymer (E/VA), ethylene/methacrylate copolymer (E/MA), ethylene/n-butyl acrylate copolymer (E/n-BA), and blends thereof.

As used herein, the term "nylon" refers to polyamide homopolymers, copolymers, or terpolymers having an amide linkage between monomer units which may be formed by any method known to those skilled in the art. The nylon monomer can be presented by the general formula: [CONH] or [CONR] where R=alkyl group. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here.

As used herein, the phrase "amorphous nylon" refers to a particular type of nylon having a morphology which is neither crystalline nor semi-crystalline. Amorphous nylons are generally characterized by a lack of crystallinity, which can be shown by the absence of an endothermic crystalline melting point determined by a Differential Scanning Calorimeter (DSC) instrument as measured in accordance with ASTM D-3417 test method.

As used herein, the phrase "nylon nucleating agent" refers to any additive which affects the morphology of the nylon by promoting the rate of growth of polymer crystals and by controlling the number, type and size of the crystals. An example of a commonly used nylon nucleating agent is talc. Talc is a fine-grained mineral represented by the formula $Mg_3Si_4O_{10}(OH)_2$.

As used herein, the terms "heat-seal", "heat-sealing", "heat-sealable", and the like refer to a first portion of a film surface (i.e., formed from a single layer or multiple layers) which is capable of forming a fusion bond to a second portion of a film surface. A heat-seal layer is capable of fusion bonding by conventional indirect heating means which generate sufficient heat on at least one film contact surface for conduction to the contiguous film contact surface and formation of a bond interface therebetween without loss of the film integrity. It should be recognized that heat-sealing can be performed by any one or more of a wide variety of manners, such as using a heat-seal technique (e.g., melt-bead sealing, thermal sealing, impulse sealing, ultrasonic sealing, hot air, hot wire, infrared radiation, etc.). The term "heat-seal" as used herein refers to a seal formed by heat-sealing a film laminate according to the present to itself in a fin-seal configuration. As used herein, the phrase "fin-seal configuration" refers to a seal formed by folding one edge of a film, substrate or laminate towards the opposite edge of a film, substrate or laminate such that the inner surface of one edge and the inner edge of the other edge are joined together by application of heat and pressure for pre-determined amount of time. Fin-seals are generally continuous along substantially the full length of a package.

As used herein, the phrase "surface layer" as applied to film layers of the present invention refers to any layer having less than two of its principal surfaces directly adhered to another layer of the film laminate.

As used herein, the phrase "oxygen barrier material" refers to any material which will control the oxygen permeability of the entire film. For perishable food packaging applications, the oxygen transmission rate (OTR) desirably should be minimized. The term "oxygen transmission rate" is defined herein as the amount of oxygen in cubic centimeters ($cm^3$) which will pass through a 100 $in^2$ of film in 24 hr at 0% RH and 23° C. (or $cm^3$/100 $in^2$ over 24 hr at 0% RH and 23° C.). The thickness (gauge) of the film has a direct relationship on the oxygen transmission rate. Packaging films which are useful as an oxygen barrier are required to have an OTR value of from about 0-10.0 $cm^3$/100 $in^2$ over 24 hr at 0% RH and 23° C. at 1.0 mils or less. Oxygen transmission may be measured according to ASTM D-3985-81 test method which is incorporated herein by reference. Oxygen barrier materials used in packaging film may include, but are not limited to, polyvinyl alcohol copolymers (PV/A), ethylene/vinyl alcohol copolymers (E/VOH), polyvinyl chlorides (PVC), polyvinylidene chloride copolymers (PVDC), polyvinylidene chloride/methyl acrylate copolymers (PVDC/MA), polyester homopolymers and copolymers, polyamide homopolymers and copolymers, polyolefin homopolymers and copolymers such as polypropylene (PP), polyethylene (PE), preferably high-density polyethylene (HDPE), metallized thermoplastic substrates of metals and/or metal oxides of such metals as aluminum, zinc, nickel, copper, bronze, gold, silver, tin, or alloys thereof, organometallic compounds, ceramics and mixtures thereof.

As used herein, the phrase "melt index" refers to the amount, in grams, of a thermoplastic resin that can be forced through an extrusion plastometer with set orifice, weight, temperature, and time. Melt index is a test used to measure the ability of a molten plastic to flow. This test is carried out according to the procedure described in ASTM D-1238 test method, which is incorporated herein by reference. The test is run by heating a material to a specific temperature, in degrees Celsius, while forcing the material through an orifice by applying a specific kilogram load. Results are reported as the amount of material that flowed through the orifice over a period of ten minutes at a specified temperature and pressure, i.e., g/10 min. Resistance to flow decreases as melt index (or grams of flow in 10 min.) increases. Data from this test is not directly transferable to end-use processing characteristics. However, data does provide an idea of the relative "flowability" of different samples. This test is also called melt flow rate.

As used herein, the terms "joins" and "adheres" are used in their broad sense to mean two formerly separate portions of a single laminate or one or two layers of a substrate which are connected together either by folding the laminate or layer onto itself thereby defining an edge or by bonding two layers together (presumably, their entire planar surfaces) with an adhesive or by other means known to those skilled in the art.

As used herein, the term "adhesive" refers to a polymer material serving a primary purpose or function of adhering two surfaces to one another. In the present invention, the adhesive may adhere one layer to another layer. The adhesive may comprise any polymer, copolymer or blend of polymers including modified and unmodified polymers, e.g., grafted copolymers, which provide sufficient interlayer adhesion to adjacent layers comprising otherwise non-adhering polymers.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Referring to FIG. 1, film laminate 10 is a cross-sectional view of one embodiment of a multilayered thermoplastic film laminate according to the present invention which includes a first polymer layer 11 and a second polymer layer 12 which are formed together as a blown coextruded film. It will be appreciated that FIG. 1 is for illustrative purposes only. First layer 11 is a surface layer relative to film 10 that may comprise any suitable heat-sealable material having a melt index of at least 20 g/min as measured in accordance with ASTM D-1238 test method at 190° C./2.16 kg. The heat-sealable material may include, but is not limited to, for example, acrylate-based resins, acrylic acid-based resins, ionomers, ethylene/α-olefin copolymers (E/AO) or blends thereof. The acrylate-based resins may include a material selected from the group consisting of methyl/methacrylate copolymer (M/MA), ethylene/vinyl acrylate copolymer (E/VA), ethylene/methacrylate copolymer (E/MA), ethylene/n-butyl acrylate copolymer (E/n-BA). The acrylic acid-based resins may include a material selected from the group consisting of ethylene/acrylic acid copolymer (E/AA), ethylene/methacrylic acid copolymer (E/MAA), or a blend thereof. Specific examples of suitable acrylate-based resins include ESCORENE™ LD 734 having a melt index of 30 g/10 min, vinyl acetate content of 19.3 (wt. %), a density of 0.940 g/cm$^3$, and a melting point of 85° C., which is available from ExxonMobil Chemical Company of Houston, Tex., U.S.A.; ULTRATHENE® UE 662-249 having a melt index of 32 g/10 min, a vinyl acetate content of 18 (wt. %), a Vicat softening point of 54° C., which is available from Equistar Chemicals, LP of Houston, Tex., U.S.A.; and ELVAX® 3176CW-3 having a melt index of 30 g/10 min, a vinyl acetate content of 18 (wt. %), a density of 0.940 g/cm$^3$, and a melting point of 84° C., and a Vicat softening point of 54° C., which is available from E.I. de Pont de Nemours and Company, Wilmington, Del., U.S.A. In one preferred embodiment, first polymer layer 11 comprises greater than 70 weight % of a heat-sealable material having a melt index of at least 20 g/10 min as measured in accordance with ASTM D-1238 test method at 190° C./2.16 kg. The first polymer layer 11 may have any thickness desired, preferably between 0.3-5.0 mils (0.000763-0.0127 cm) and more preferably at least 0.45 mil (0.001143 cm).

Second polymer layer 12 may comprise a polyolefin, preferably an polyethylene, more preferably, a low-density polyethylene, and most preferably, an ultra low-density polyethylene copolymer. An example of a suitable ultra low-density polyethylene copolymer is a material which has a density of 0.9120 g/cm$^3$, a melt index of 1.0 g/10 min, a melting point of 123° C., and a haze of 71%, which is sold under the trademark ATTANE® 4201G from The Dow Chemical Company, Midland, Mich., U.S.A. For certain applications where the amount of heat-sealable material having a melt index of at least 20 g/10 min present in first polymer layer 11 is less than or equal to 70 weight %, second polymer layer 12 may have any thickness desired such that the thickness of the first polymer layer 11 is A, the total thickness of film 10 is B and the relative values of A and B satisfy the relationship A/B≧0.30. Alternatively, where the amount of heat-sealable material having a melt index of at least 20 g/10 min present in first polymer layer 11 is greater than 70 weight %, first polymer 11 may have any desired thickness, and the relative values of A and B may or may not satisfy the relationship A/B≧0.3.

Figure 2:
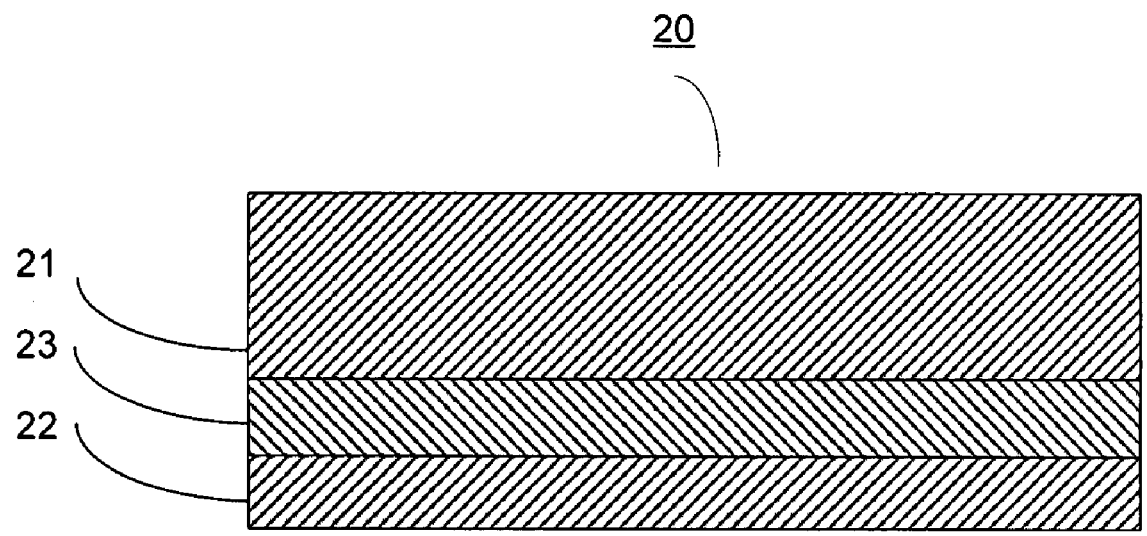
FIG. 2 is a partially schematic, cross-sectional view of one embodiment of a film laminate according to the present invention having three polymer layers.

Referring to FIG. 2, film laminate 20 is a cross-sectional view of one embodiment of a multi-layered thermoplastic film laminate according to the present invention which includes a first polymer layer 21, a second polymer layer 22, and a third polymer layer 23, all of which are formed together as a blown co-extruded film. First polymer layer 21 and second polymer layer 22 may have identical compositions as those for layer 11 and layer 12, respectively, of film 10, as described for the film laminate illustrated in FIG. 1. As depicted, third polymer layer 23 is disposed between first polymer layer, 21 and second polymer layer, 22. Third polymer layer 23 may comprise a polyolefin, a modified polyolefin, or any suitable oxygen barrier material, such that the film 21 comprises an oxygen transmission rate of between 0-2.0 cm$^3$/100 in$^2$ over 24 hr at 0% RH and 23° C. as measured in accordance with ASTM D-3985-81 test method. The oxygen barrier material may be selected from the group consisting of ethylene/vinyl alcohol copolymer (E/VOH), copolymers of vinylidene chloride (PVDC) and blends thereof, and most preferably, ethylene vinyl alcohol copolymer (E/VOH). Exemplary of a suitable ethylene/vinyl alcohol copolymer is a material which has a 38% (mole) ethylene content, a melting point of 173° C., a melt flow index of 3.2, and a glass transition temperature of 58° C., which is sold under the trademark SOARNOL® ET3803 and is available from Soarus L.L.C., Arlington Heights, Ill., U.S.A. In this particular embodiment, the amount of heat-sealable material having a melt index of at least 20 g/min. present in first polymer layer 21 is less than or equal to 70 weight %, third polymer layer 23 may have any thickness desired such that the thickness of the first polymer layer 21 is A, the total thickness of film 20 is B and the relative values of A and B satisfy the relationship A/B≧0.30. Alternatively, where the amount of heat-sealable material having a melt index of at least 20 g/10 min present in first polymer layer 21 is greater than 70 weight %, first polymer 21 and second polymer layer 22 may have any desired thickness, the total thickness of film 20 is B, and the relative values of A and B may or may not satisfy the relationship A/B≧0.3.

Figure 3:
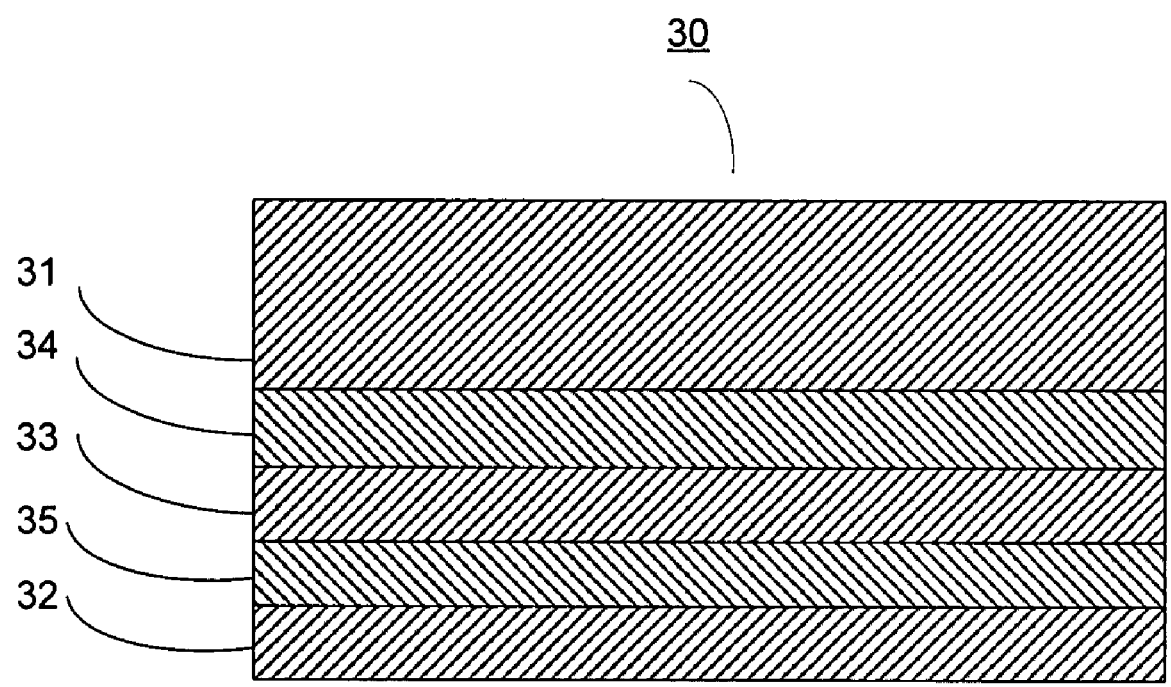
FIG. 3 is a partially schematic, cross-sectional view of one embodiment of a film laminate according to the present invention having five polymer layers.

Referring to FIG. 3, film laminate 30 is a cross-sectional view of one embodiment of a multi-layered thermoplastic film laminate according to the present invention which includes a first polymer layer 31, a second polymer layer 32, a third polymer layer 33, a fourth polymer layer 34, and a fifth polymer layer 35, all of which are formed together as a blown coextruded film. First polymer layer 31 and second polymer layer 32 may be similar in composition to polymer layers 11 and 12 as those described in film laminate 10 and illustrated in FIG. 1. Third polymer layer 33 may comprise a nylon or nylon blend and have an identical composition as layer 23 as described in film 20 and illustrated in FIG. 2. As depicted, polymer layer 34 may be disposed between polymer layer 31 and polymer layer 33, whereas polymer layer 35 may be disposed between polymer layer 33 and polymer layer 32. Both polymer layer 34 and polymer layer 35 may each comprise a nylon or a nylon blend wherein the nylon or nylon blend are each free of both amorphous nylon and nylon nucleating agents. Preferably, the nylon copolymer comprises nylon 6/66 copolymer. Exemplary of a suitable nylon copolymer is a material which has a density of 1.13 g/cm³, a moisture content of less than 0.0%, and a viscosity number (solution 0.005 g/ml sulfuric acid) of 195 ml/g, which is available under the trademark ULTRAMID® C35 NATURAL from BASF Corporation, Mount Olive, N.J., U.S.A. It will be noted that in this particular embodiment, polymer layers 32, 33, 34, and 35 may have any thickness desired with the proviso that the thickness of the first polymer layer 31 is A, the total thickness of film 30 is B, and the relative values of A and B satisfy the relationship A/B≧0.30 when the amount of heat-sealable material having a melt index of at least 20 g/10 min present in first polymer layer 31 is less than or equal to 70 weight %. Alternatively, first polymer 31, 32, 33, 34, and 35 may have any desired thickness, the total thickness of film 30 is B and the relative values of A and B may or may not satisfy the relationship A/B≧0.3 when the amount of heat-sealable material having a melt index of at least 20 g/10 min present in first polymer layer 31 is greater than 70 weight %.

Figure 4:
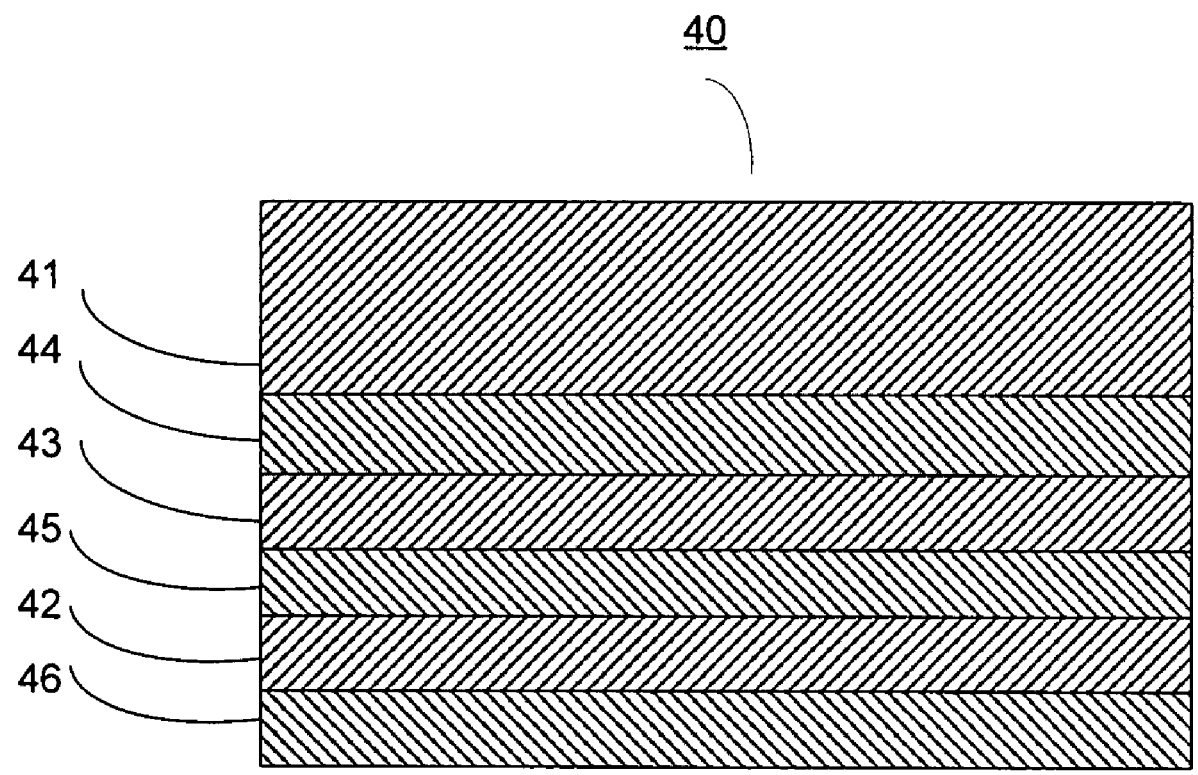
FIG. 4 is a partially schematic, cross-sectional view of one embodiment of a film laminate according to the present invention having six polymer layers.

Referring to FIG. 4, film laminate 40 is a cross-sectional view of one embodiment of a multi-layered thermoplastic film laminate according to the present invention which includes a first polymer layer 41, a second polymer layer 42, a third polymer layer 43, a fourth polymer layer 44, a fifth polymer layer 45, and sixth polymer layer 46. First polymer layer 41 and second polymer layer 42 may have identical compositions as those for polymer layers 11 and 12 as described for film laminate 10 and illustrated in FIG. 1. Third polymer layer 43 may comprise an oxygen barrier material similar in composition to polymer layer 23 as described for film laminate 20 and illustrated in FIG. 2. Fourth polymer layer 44 and fifth polymer layer 45 may comprise nylon copolymer and may be similar in composition as those for polymer layer 34 and 35, respectively, as described for film laminate 30 illustrated in FIG. 3. Preferably, first polymer layer 41, second polymer layer 42, third polymer layer 43, fourth polymer layer 44, and fifth polymer layer 45 are all formed together as a blown coextruded film. As depicted, polymer layer 46 may be disposed adjacent to second polymer layer 42 and may function as a surface layer relative to film 40. It will be appreciated that polymer layer 46 may be bonded to polymer layer 42 by using any conventional lamination technique such as extrusion, adhesive lamination and the like. Polymer layer 46 may comprise any oriented material suitable for packaging applications, preferably an oriented material selected from the group consisting of polyester, polyolefin, polyamide, and blends thereof. Suitable polyesters for use may include a material selected from the group consisting of uniaxial-oriented polyester, biaxially-oriented polyester and blends thereof, and preferably, a material selected from the group consisting of uniaxial-oriented polyethylene terephthalate, biaxially-oriented polyethylene terephthalate and blends thereof. Suitable oriented polyolefins may include a material selected from the group consisting of uniaxial-oriented polyolefin, biaxially-oriented polyolefin and blends thereof and, preferably, a material selected from the group consisting of uniaxial-oriented polypropylene, biaxially-oriented polypropylene and blends thereof. An example of a suitable biaxially-oriented polyethylene terephthalate is a material having tensile strength of 25 (machine direction) and 28 (transverse direction), an elongation at break 150% (machine direction) and 120% (transverse direction), haze of 3%, a gloss of 170%, and a thickness of 36 gauge which is commercially available as SKYROL™ SP65 supplied by SKC, Inc., Covington, Ga., U.S.A. It will be noted that in this particular embodiment, the amount of heat-sealable material having a melt index of at least 20 g/10 min present in first polymer layer 21 is less than or equal to 70 weight %, polymer layers 42, 43, 44, and 45 may have any thickness desired with the proviso that the thickness of the first polymer layer 41 is A, the total thickness of film 40 is B, and the relative values of A and B satisfy the relationship A/B≧0.30. Alternatively, when the amount of heat-sealable material having a melt index of at least 20 g/10 min present in first polymer layer 41 is greater than 70 weight %, polymer layers 41, 42, 43, 44, and 45 may have any desired thickness, the total thickness of film 40 is B, and the relative values of A and B may or may not satisfy the relationship A/B≧0.3.

Figure 5:
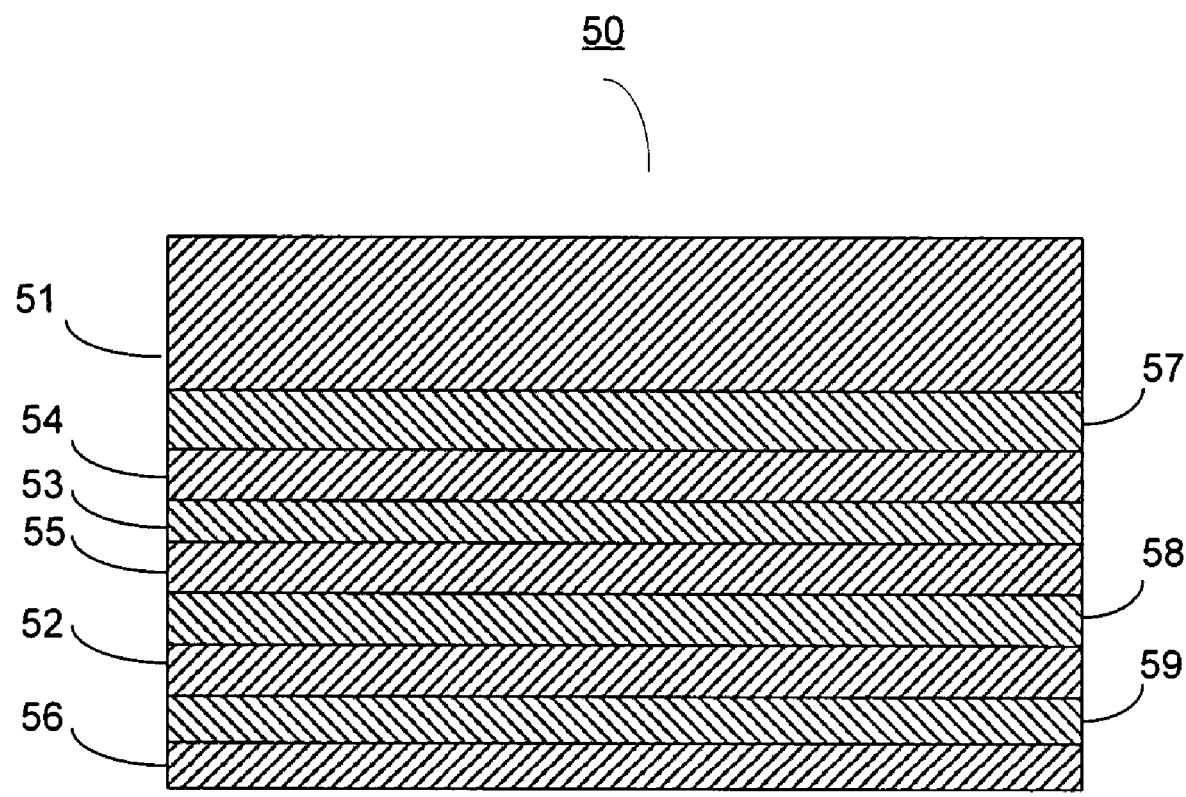
FIG. 5 is a partially schematic, cross-sectional view of one embodiment of a film laminate according to the present invention having nine polymer layers.

Referring to FIG. 5, film laminate 50 is a cross-sectional view of one embodiment of a multi-layered thermoplastic film laminate according to the present invention which includes a first polymer layer 51, a second polymer layer 52, a third polymer layer 53, a fourth polymer layer 54, a fifth polymer layer 55, a sixth polymer layer 56, a seventh polymer layer 57, an eighth polymer layer 58, and a ninth polymer layer 59. Polymer layer 51 is a surface layer relative to film 50 and may comprise a heat-sealable material which is similar in composition to polymer layer 11 as described for the film laminate 10 and illustrated in FIG. 1.

In particular, first polymer layer 51 comprises a blend of two ethylene/vinyl acrylate copolymers (E/VA) including 92 weight % of a first ethylene/vinyl acrylate copolymer having a melt index of 30 g/10 min, a vinyl acetate content of 18 (wt. %), a density of 0.940 g/cm³, and a melting point of 84° C., and a Vicat softening point of 54° C., such as ELVAX® 3176CW-3 which is available from E.I. de Pont de Nemours and Company, Wilmington, Del., U.S.A., and 8 weight % of a masterbatch comprising ethylene/vinyl acrylate copolymer and processing additives. The ethylene/vinyl acrylate copolymer used in the masterbatch may have a melt index of at least 20 g/10 min, or a vinyl acetate content of 18 (wt. %), or a melt index of at least 20 g/10 min and a vinyl acetate content of 18 (wt. %). First polymer layer 51 may have any desired thickness and typically has a thickness of between 0.25 to 1.50 mil, or about 0.55 to 0.65 mil.

Polymer layer 52 may include polyolefin similar in composition to polymer layer 12 as described in film laminate 10 and illustrated in FIG. 1. In particular, polymer layer 52 comprises 91.8 weight % of an ultra low-density polyethylene copolymer having a density of 0.9120 g/cm$^3$, a melt index of 1.0 g/10 min, a melting point of 123° C., for example, ATTANE® 4201G which available from The Dow Chemical Company, Midland, Mich., U.S.A., and 8.2 weight % of a mixture of antiblock and slip additives and processing aids. It should be appreciated that polymer layer 52 may have any desired thickness and typically has a thickness of between 0.10 to 0.30 mil, or preferably, about 0.14 to 0.26 mil.

Polymer layer 53 may comprise an oxygen barrier material similar in composition to polymer layer 23 as described for film laminate 20 and illustrated in FIG. 2. In particular, polymer layer 53 comprises 100 weight % of an ethylene/vinyl alcohol copolymer having a 38% (mole) ethylene content, a melting point of 173° C., a melt flow index of 3.2 g/10 min, and a glass transition temperature of 58° C., such as SOARNOL® ET3803 which is available from Soarus L.L.C., Arlington Heights, Ill., U.S.A. Alternatively, polymer layer 53 may comprise a polyolefin, e.g., polyethylene, a modified polyolefin, e.g., anhydride-modified polyethylene, or a combination of a polyolefin and a modified polyolefin, such as, for example, polyethylene and anhydride-modified polyethylene. An example of a preferred polyethylene is a blend of an ultra-low density polyethylene having a density of 0.912 g/cm$^3$ and a melt index of 0.8 g/10 min. An example of a preferred anhydride-modified polyethylene is anhydride-modified linear low-density polyethylene is a material which has a density of 0.0939 g/cm$^3$, a melting point of 127° C., a melt index of 4.0 g/10 min, and a Vicat softening point of 116.0° C., which is sold under the trademark PLEXAR® PX 3308 and is available from Equistar Chemicals, LP of Houston, Tex., U.S.A. It should be appreciated that polymer layer 53 may have any desired thickness and typically has a thickness of between 0.10 to 0.20 mil, or preferably, about 0.15 mil.

Polymer layers 54 and 55 may each comprise a nylon or nylon blend similar in composition to polymer layers 34 and 35 as described for the film laminate 30 illustrated in FIG. 3. Specifically, polymer layers 54 and 55 each comprise 100 weight % of a nylon 6/66 grade material having a density of 1.13 g/cm$^3$, a moisture content of less than 0.1%, and a viscosity number (solution 0.005 g/ml sulfuric acid) of 195 ml/g, such as the material available under the trademark ULTRAMID® C35 NATURAL from BASF Corporation, Mount Olive, N.J., U.S.A. Alternatively, polymer layers 54 and 55 may each comprise a blend of nylon polymers, e.g., nylon 6 and 6/66 grade materials, in particular, a blend of 80 weight % of nylon 6 and 20 weight % of nylon 6/66. An example of a suitable nylon 6 material has a density of 1.13 g/cm$^3$, a moisture content of less than 2.6% at 50% RH, and a viscosity number (solution 0.005 g/ml sulfuric acid) of 218 ml/g, such as the material available under the trademark ULTRAMID® C36 NATURAL from BASF Corporation, Mount Olive, N.J., U.S.A. It should be appreciated that polymer layers 54 and 55 may have any desired thickness and typically have a thickness of between 0.08 to 0.20 mil or preferably, between 0.10 to 0.14 mil.

Polymer layer 56 may serve as a surface layer relative to film 50 and may comprise an oriented thermoplastic material similar in composition to polymer layer 46 as described for the film laminate 40 illustrated in FIG. 4. Specifically, polymer layer 56 comprises biaxially-oriented polyethylene terephthalate having tensile strength of 25 (machine direction) and 28 (transverse direction), an elongation at break 150% (machine direction) and 120% (transverse direction), and has a thickness of 36 gauge. An example of a biaxially-oriented polyethylene terephthalate having these properties is SKYROL™ SP65 which is supplied by SKC, Inc., Covington, Ga., U.S.A. It should be appreciated that polymer layer 56 may have any desired thickness and typically has a thickness of between 36 gauge (0.36 mil) to 48 gauge (0.48 mil).

Polymer layers 57, 58, and 59 may each include an adhesive (or tie layer material) such that the composition may include a polyolefin, e.g., polyethylene, an acrylate-based resin, an acrylic acid-based resin, a modified polyolefin, a modified acrylate-based resin, a modified acrylic acid-based resin, or a combination thereof. Preferably, polymer layers 57, 58, and 59 each comprise a polyethylene or an anhydride-modified polyethylene, and most preferably, an anhydride-modified linear low-density polyethylene. One example of suitable anhydride-modified linear low-density polyethylene is a material which has a density of 0.0939 g/cm$^3$, a melting point of 127° C., a melt index of 4.0 g/10 min, and a Vicat softening point of 116.0° C., which is sold under the trademark PLEXAR® PX 3308 and is available from Equistar Chemicals, LP of Houston, Tex., U.S.A. Another example of a suitable anhydride-modified linear low-density polyethylene is a material which has a density of 0.91 g/cm$^3$, a melting point of 115° C., a melt index of 2.7 g/10 min, and a Vicat softening point of 103° C., which is sold under the trademark BYNEL® 41E710 and available from E.I. de Pont de Nemours and Company, Wilmington, Del., U.S.A. It should be appreciated that polymer layers 57, 58, and 59 may each have any desired thickness and typically each has a thickness of between 0.08 to 1.0 mil or between 0.15 to 0.75 mil.

As depicted, polymer layer 57 is positioned between polymer layers 51 and 54, polymer layer 58 is disposed between polymer layers 55 and 52, and polymer layer 59 is positioned between polymer layers 52 and 56. It will be appreciated by those skilled in the art that a coating, e.g., an anchor coating (commonly known as a primer), may be applied to the surface of polymer layer 56 facing polymer layer 59, the surface of polymer layer 59 facing polymer layer 56, or surfaces of both polymer layers 56 and 59 facing each other in order to facilitate the bonding of polymer layer 56 to polymer layer 59.

It will be appreciated that polymer layers 51-55 and 57-58 may be formed together as a coextruded blown film. It will be appreciated that polymer layer 59 may be used to bond polymer layer 56 to polymer layer 52 by using any conventional lamination technique such as extrusion, adhesive lamination and the like.

It will be noted that film laminate 50 may have any total thickness desired depending upon the end-result application. Typically, film laminate 50 may have a total thickness of between 0.75 to 10 mil, between 1.0 to 5.0 mil, or between 1.50 to 3.0 mil. Preferably, when the amount of heat-sealable material having a melt index of at least 20 g/10 min is present in first polymer layer 51 in an amount of less than or equal to 70 weight %, the thickness of polymer layer 51 is A, the total thickness of film 50 is B and the relative values of A and B satisfy the relationship $A/B \geq 0.30$. Alternatively, when the amount of heat-sealable material having a melt index of at least 20 g/10 min present in first polymer layer 51 is greater than 70 weight %, polymer layers 51 through 59 may have any desired thickness, the total thickness of film 50 is B, and the relative values of A and B may or may not satisfy the relationship A/B≧0.3.

Unless otherwise noted, the physical properties and performance characteristics reported herein were measured by test procedures similar to the following methods. The following ASTM test procedures are hereby incorporated herein by reference in their entirety.

| | |
|---|---|
| Density | ASTM D-1505 |
| Elongation at Break | ASTM D-882 |
| Fusion Seal Temperature | ASTM F-88-00 |
| Glass Transition Temperature | ASTM D-3417 |
| Gloss | ASTM D-523 |
| Haze | ASTM D-1003 |
| Melting Point | ASTM D-3417 |
| Melt Index | ASTM D-1238 |
| Oxygen Transmission Rate | ASTM D-3985 |
| Tensile Strength | ASTM D-882 |
| Unrestrained Linear Thermal Shrinkage | ASTM D-2732-96 |
| Vicat Softening Point | ASTM D-1525 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multi-layered thermoplastic film laminate for packaging applications comprising:
   a) at least a first polymer layer and a second polymer layer;
   b) wherein said first and second polymer layers are formed together as a blown coextruded film;
   c) wherein said first polymer layer is a surface layer relative to said film which comprises greater than 70 weight % of a heat-sealable resin having a melt index of at least 20 g/10 min as measured in accordance with ASTM D-1238 test method at 190° C./2.16 kg; and
   d) wherein said second polymer layer has a melt index of 10 g/10 min or less as measured in accordance with ASTM D-1238 test method at 190° C./2.16 kg.

2. A multi-layered thermoplastic film for packaging applications according to claim 1, wherein said heat-sealable resin has a melt index of at least 30 g/10 min as measured in accordance ASTM D-1238 test method at 190° C./2.16 kg.

3. A multi-layered thermoplastic film laminate for packaging applications according to claim 1, wherein said heat-sealable resin comprises a material selected from the group consisting of acrylate-based resin, acrylic acid-based resin, ionomer, ethylene/α-olefin copolymer (E/AO), and blends thereof.

4. A multi-layered thermoplastic film laminate for packaging applications according to claim 3, wherein said acrylic acid-based resin comprises a material selected from the group consisting of ethylene/acrylic acid copolymer (E/AA), ethylene/methacrylic acid copolymer (E/MAA), and blends thereof.

5. A multi-layered thermoplastic film laminate for packaging applications according to claim 4, wherein said acrylate-based resin comprises a material selected from the group consisting of methyl/methyacrylate copolymer (M/MA), ethylene/vinyl acrylate copolymer (E/VA), ethylene/methacrylate copolymer (E/MA), ethylene/n-butyl acrylate copolymer (E/n-BA), and blends thereof.

6. A multi-layered thermoplastic film laminate for packaging applications according to claim 1, wherein said second polymer layer comprises polyolefin having a melt index of 1 g/10 min or less as measured in accordance with ASTM D-1238 test method at 190° C./2.16 kg.

7. A multi-layered thermoplastic film laminate for packaging applications according to claim 1, wherein said film further comprises a third polymer layer disposed between said first and second polymer layers; wherein said first, second, and third polymer layers are formed together as a blown coextruded film.

8. A multi-layered thermoplastic film laminate for packaging applications according to claim 7, wherein said third polymer layer comprises a polyolefin, a modified polyolefin, or an oxygen barrier material such that said film comprises an oxygen transmission rate of between 0-2.0 cm$^3$/100 in$^2$ over 24 hr at 0% RH and 23° C. as measured in accordance with ASTM D-3985-81 test method.

9. A multi-layered thermoplastic film laminate for packaging applications according to claim 1, wherein said film comprises an unrestrained linear thermal shrinkage of between 0-5% at 85° C. as measured in accordance with ASTM D-2732-96 test method.

10. A multi-layered thermoplastic film laminate for packaging applications according to claim 7, wherein said third polymer layer comprises a polyethylene, a modified polyethylene or an oxygen barrier material selected from the group consisting of ethylene/vinyl alcohol copolymer (E/VOH), polyvinylidene chloride copolymer (PVDC), and blends thereof.

11. A multi-layered thermoplastic film laminate for packaging applications according to claim 7, wherein said film further comprises a fourth polymer layer disposed between said first and third polymer layers and a fifth polymer layer disposed between said second and third polymer layers; wherein said fourth and fifth polymer layers each comprise a nylon or nylon blend; wherein said first, second, third, fourth, and fifth polymer layers are formed together as a blown coextruded film.

12. A multi-layered thermoplastic film laminate for packaging applications according to claim 11, wherein said nylon or nylon blend are each free of both nylon nucleating agents and amorphous nylon.

13. A multi-layered thermoplastic film laminate for packaging applications according to claim 11, wherein said film further comprises a sixth polymer layer.

14. A multi-layered thermoplastic film laminate for packaging applications according to claim 13, wherein said sixth polymer layer is a surface layer relative to said film and is disposed adjacent to said second polymer layer by lamination.

15. A multi-layered thermoplastic film laminate for packaging applications according to claim 14, wherein said sixth polymer layer comprises an oriented thermoplastic material selected from the group consisting of polyester, polyolefin, polyamide, and blends thereof.

16. A multi-layered thermoplastic film laminate for packaging applications according to claim 13, wherein said film further comprises a seventh polymer layer, an eighth polymer layer, and a ninth polymer layer; wherein said seventh polymer layer is disposed between said first and fourth polymer layers; said eighth polymer layer is disposed between said second and fifth polymer layers; said ninth polymer layer is disposed between said second and sixth polymer layers; wherein said seventh, eighth, and ninth polymer layers each comprise an adhesive.

17. A multi-layered thermoplastic film laminate for packaging applications comprising:
  a) at least a first polymer layer and a second polymer layer;
  b) wherein said first and second polymer layers are formed together as a blown coextruded film;
  c) wherein said first polymer layer is a surface layer relative to said film which comprises greater than 70 weight % of a heat-sealable resin having a melt index of at least 20 g/10 min as measured in accordance with ASTM D-1238 test method at 190° C./2.16 kg;
  wherein said heat-sealable resin comprises a material selected from the group consisting of acrylate-based resin, acrylic acid-based resin, ionomer, ethylene/α-olefin copolymer (E/AO), and blends thereof; and
  d) wherein said second polymer layer has a melt index of 10 g/10 min or less as measured in accordance with ASTM D- 1238 test method at 190° C./2.16 kg.

18. A multi-layered thermoplastic film laminate for packaging applications according to claim 17, wherein said heat-sealable resin has a melt index of at least 30 g/10 min as measured in accordance with ASTM D-1238 test method at 190° C./2.16 kg.

19. A multi-layered thermoplastic film laminate for packaging applications according to claim 17, wherein said acrylic acid-based resin comprises a material selected from the group consisting of ethylene/acrylic acid copolymer (E/AA), ethylene/methactylic acid copolymer (E/MAA), and blends thereof.

20. A multi-layered thermoplastic film laminate for packaging applications according to claim 17, wherein said acrylate-based resin comprises a material selected from the group consisting of methyl/methacrylate copolymer (M/MA), ethylene/vinyl actylate copolymer (F/VA), ethylene/methacrylate copolymer (F/MA), ethvlene/n-butyl actylate copolymer (Em-BA), and blends thereof.

21. A multi-layered thermoplastic film laminate for packaging applications according to claim 17, wherein said second polymer layer comprises polyolefin having a melt index of 1 g/10 min or less as measured in accordance with ASTM D-1238 test method at 190° C./2.16 kg.

22. A multi-layered thermoplastic film laminate for packaging applications according to claim 17, wherein said film further comprises a third polymer layer disposed between said first and second polymer layers;wherein said first, second, and third polymer layers are formed together as a blown coextruded film.

23. A multi-layered thermoplastic film laminate for packaging applications according to claim 22, wherein said third polymer layer comprises a polyolefin, a modified polyolefin, or an oxygen barrier material such that said film comprises an oxygen transmission rate of between 0-2.0 cm³/100 in² over 24 hr at 0% RH and 23° C. as measured in accordance with ASTM D-3985-81 test method.

24. A multi-layered thermoplastic film laminate for packaging applications according to claim 22, wherein said third polymer layer comprises polyethylene, a modified polyethylene, or an oxygen barrier material selected from the group consisting of ethylene/vinyl alcohol copolymer (E/VOH), polyvinylidene chloride copolymer (PVDC), and blends thereof.

25. A multi-layered thermoplastic film laminate for packaging applications according to claim 22, wherein said film further comprises a fourth polymer layer and a fifth polymer layer; wherein said fourth polymer layer is disposed between said first and third polymer layers, wherein said fifth polymer layer is disposed between said second and third polymer layers; wherein said fourth and fifth polymer layers each comprise a nylon or a nylon blend; wherein said first, second, third, fourth, and fifth polymer layers are formed together as a blown coextruded film.

26. A multi-layered thermoplastic film laminate for packaging applications according to claim 25, wherein said nylon or nylon blend are each free of both nylon nucleating agents and amorphous nylon.

27. A multi-layered thermoplastic film laminate for packaging applications according to claim 25, wherein said film further comprises a sixth polymer layer.

28. A multi-layered thermoplastic film laminate for packaging applications according to claim 27, wherein said sixth polymer layer is a surface layer relative to said film and is disposed adjacent to said second polymer layer by lamination.

29. A multi-layered thermoplastic film laminate for packaging applications according to claim 28, wherein said sixth polymer layer comprises an oriented thermoplastic material selected from the group consisting of polyester, polyolefin, polyamide, and blends thereof.

30. A multi-layered thermoplastic film laminate for packaging applications according to claim 27, wherein said film further comprises a seventh polymer layer, an eighth polymer layer, and a ninth polymer layer; wherein said seventh polymer layer is disposed between said first and fourth polymer layers; wherein said eighth polymer layer is disposed between said second and fifth polymer layers; wherein said ninth polymer layer is disposed between said second and sixth polymer layers; wherein said seventh, eighth, and ninth polymer layers each comprise an adhesive.

31. A multi-layered thermoplastic film laminate for packaging applications comprising:
  a) at least a first polymer layer; a second polymer layer, a third polymer layer, a fourth polymer layer, and a fifth polymer layer;
  b) wherein said first, second, third, fourth and fifth polymer layers are formed together as a blown coextruded film;
  c) wherein said first polymer layer is a surface layer relative to said film which comprises greater than 70 weight % of a heat-sealable resin having a melt index of at least 20 g/10 mm as measured in accordance with ASTM D-1238 test method at 190° C./2.16 kg; wherein said heat-sealable resin comprises a material selected from the group consisting of acrylate-based resin, acrylic acid-based resin, ionomer, ethylene/α-olefin copolymer (E/AO), and blends thereof;
  d) wherein said second polymer layer comprises nylon homopolymer, copolymer, or blend thereof; wherein said second polymer layer is disposed between said first and third polymer layers;
  e) wherein said third polymer layer comprises polyethylene, modified-polyethylene, or an oxygen barrier material selected from the group consisting of ethylene/vinyl alcohol copolymer (E/VOH), polyvinylidene chloride copolymer (PVDC), and blends thereof; said third is disposed between said second and fourth polymer layers;
  f) wherein said fourth polymer layer comprises a nylon or nylon blend; wherein said fourth polymer layer is disposed between said third and fifth polymer layers; and
  g) wherein said fifth polymer layer comprises polyolefin having a melt index of 1 g/10 min or less as measured in accordance with ASTM D-1238 test method at 190° C./2.16 kg.

32. A multi-layered thermoplastic film laminate for packaging applications according to claim 31, wherein said heat-sealable resin has a melt index of at least 30 g/10 min as measured in accordance with ASTM D-1238 test method at 190° C./2.16 kg.

33. A multi-layered thermoplastic film laminate for packaging applications according to claim 31, wherein said acrylic acid-based resin comprises a material selected from the group consisting of ethylene/acrylic acid copolymer (E/AA), ethylene/methacrylic acid copolymer (E/MAA), and blends thereof.

34. A multi-layered thermoplastic film laminate for packaging applications according to claim 31, wherein said acrylate-based resin comprises a material selected from the group consisting of methyl/methacrylate copolymer (M/MA), ethylene/vinyl acrylate copolymer (E/VA), ethylene/methacrylate copolymer (E/MA), ethylene/n-butyl acrylate copolymer (E/n-BA), and blends thereof.

35. A multi-layered thermoplastic film laminate for packaging applications according to claim 31, wherein said nylon or nylon blend are each free of both nylon nucleating agents and amorphous nylon.

36. A multi-layered thermoplastic film laminate for packaging applications according to claim 31, wherein said film further comprises a sixth polymer layer.

37. A multi-layered thermoplastic film laminate for packaging applications according to claim 36, wherein said sixth polymer layer is a surface layer relative to said film and is disposed adjacent to said fifth polymer layer by lamination.

38. A multi-layered thermoplastic film laminate for packaging applications according to claim 37, wherein said sixth polymer layer comprises an oriented thermoplastic material selected from the group consisting of polyester, polyolefin, polyamide, and blends thereof.

39. A multi-layered thermoplastic film laminate for packaging applications according to claim 36, wherein said film further comprises a seventh polymer layer, an eighth polymer layer, and a ninth polymer layer; wherein said seventh polymer layer is disposed between said first and second polymer layers; wherein said eighth polymer layer is disposed between said fourth and fifth polymer layers; wherein said ninth polymer layer is disposed between said fifth and sixth polymer layers; wherein said seventh, eighth, and ninth polymer layers each comprise an adhesive.

40. A multi-layered thermoplastic film laminate for packaging applications according to claims 1, 17, or 31, wherein said film forms a food package or portion thereof.

* * * * *

UNITED STATES PATENT AND TRADEMARK OFFICE
CERTIFICATE OF CORRECTION

PATENT NO. : 7,504,142 B2  
APPLICATION NO. : 11/895605  
DATED : March 17, 2009  
INVENTOR(S) : Christopher John Harvey Page 1 of 1

It is certified that error appears in the above-identified patent and that said Letters Patent is hereby corrected as shown below:

Column 3, line 41, "nylon or nylon are" should read --nylon or nylon blend are--; line 54, "fifth, seventh," should read --fifth, sixth, seventh,--.
Column 7, line 34, "[H$_2$C C]" should read --[H$_2$C-C]--; line 51, "R-alkyl" should read --R=alkyl--.
Column 11, line 40, "0.0%" should read --0.1%--.
Column 17, Claim 19, lines 29 and 30, "ethylene/methactylic" should read --ethylene/methacrylic--.
Column 17, Claim 20, line 36, "actylate copolymer (F/VA)" should read --acrylate copolymer (E/VA)--; line 37, "(F/MA), ethvlene/n-butyl actylate" should read --(E/MA), ethylene/n-butyl acrylate--.
Column 18, Claim 31, line 44, "g/10 mm" should read --g/10 min--.

Signed and Sealed this

Twenty-second Day of September, 2009

David J. Kappos
*Director of the United States Patent and Trademark Office*